(12) United States Patent
Liberty et al.

(10) Patent No.: US 6,443,633 B1
(45) Date of Patent: Sep. 3, 2002

(54) OPTICAL DEVICE PACKAGE

(75) Inventors: Jonathan Liberty, Ottawa; Gary S. Duck, Nepean, both of (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/921,821

(22) Filed: Aug. 6, 2001

Related U.S. Application Data

(60) Provisional application No. 60/224,024, filed on Aug. 10, 2000.

(51) Int. Cl.[7] ............................................... G02B 6/255
(52) U.S. Cl. ........................................................ 385/99
(58) Field of Search ........................... 385/99, 33, 129, 385/34, 39, 50, 52, 62, 67, 16, 36, 22

(56) References Cited

U.S. PATENT DOCUMENTS

| | | | | |
|---|---|---|---|---|
| 6,185,347 B1 | * | 2/2001 | Zheng | 385/16 |
| 6,215,919 B1 | * | 4/2001 | Li et al. | 385/16 |
| 6,272,264 B1 | * | 8/2001 | Li et al. | 385/24 |
| 6,282,339 B1 | * | 8/2001 | Zheng | 385/24 |
| 6,359,054 B1 | * | 3/2002 | Lemieux et al. | 424/426 |
| 6,379,054 B2 | * | 4/2002 | Throckmorton et al. | 385/56 |

* cited by examiner

Primary Examiner—Tulsidas Patel
(74) Attorney, Agent, or Firm—Neil Teitelbaum

(57) ABSTRACT

A package for an optical device comprising two mating sections, each section including a rigid outer protective shell and a resilient inner body. The package is easily clamped together using snap clips, which are integral with the rigid outer protective shells. Preferably, strain relief is provided integrated on each end of the resilient bodies.

20 Claims, 5 Drawing Sheets

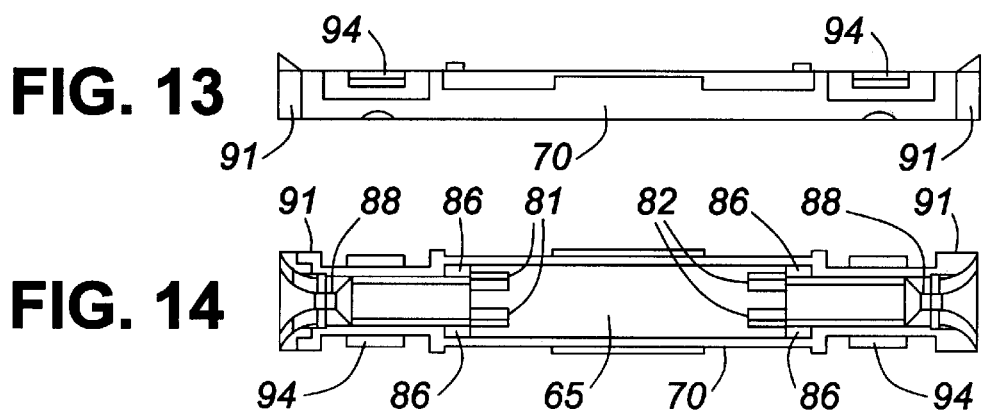
FIG. 13
FIG. 14
FIG. 15
FIG. 16
FIG. 17
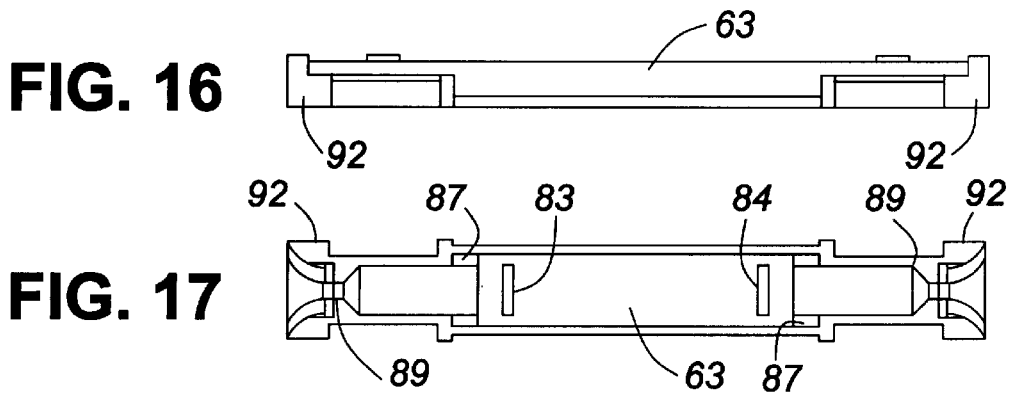
FIG. 19
FIG. 20
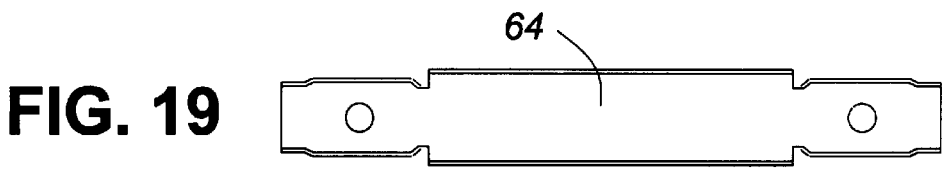
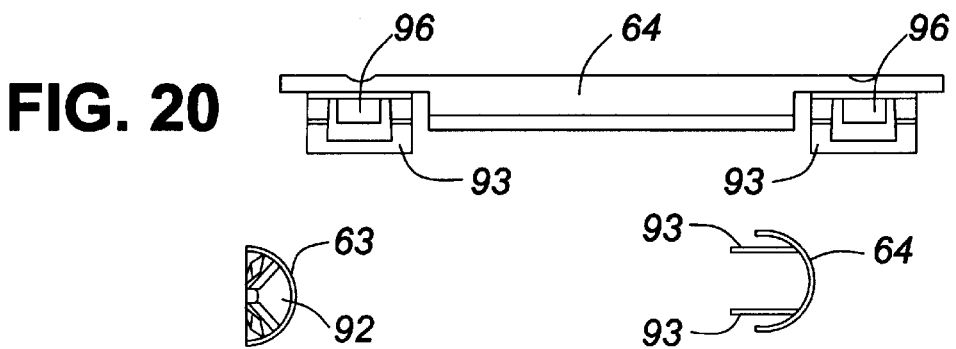
FIG. 18  FIG. 21

OPTICAL DEVICE PACKAGE

CROSS-REFERENCE TO RELATED APPLICATIONS

The present invention claims priority from previously filed U.S. patent application Ser. No. 60/224,024 filed Aug. 10, 2000.

TECHNICAL FIELD

The present application relates to optical device packages, and in particular to a package for enclosing a wavelength division multiplexing (WDM) coupler.

BACKGROUND OF THE INVENTION

Optical devices, such as WDM couplers, require special packaging for protecting the devices from mechanical, as well as thermal, stresses. Much of the difficulty in designing a suitable package arises from the fact that the optical devices are comprised of several elements with different diameters that have been fixed, e.g. glued, together. Moreover, no two devices are identical, because during assembly the elements are individually adjusted to obtain the highest possible optical coupling.

Conventional packages for optical devices include a rigid outer housing surrounding a rigid insert, into which the optical device is mounted and fixed. To avoid thermally induced stress, the insert is made up of a material that has thermal-expansion characteristics that are similar to those of the optical device. After the optical device is fixed to the insert, the rigid outer housing is glued or otherwise sealed together over the insert. Alternatively, if the outer housing is a rigid cylindrical sleeve, it is slipped over the optical device with the insert, and then sealed at each end. If strain relief is required, it is usually provided by mounting resilient tubes over the fibers prior to assembly, and fixing them in position during assembly. All of the aforementioned packages require several labor intensive assembly steps, while providing only limited protection. Moreover, if strain relief is required, the tubes must by positioned on the fiber before the optical device is assembled, adding to the complexity of the assembly process.

An object of the present invention is to provide an optical device package that overcomes the shortcomings of the prior art, and provides increased protection to the enclosed optical device. Another object of the present invention is to provide an optical device package that can be assembled quickly and easily without the need for labor intensive steps. Another object of the present invention is to provide a package with integrated strain relief.

SUMMARY OF THE INVENTION

Accordingly, the present invention relates to a package for an optical device of the type comprising a plurality of elements including a first element that is not coaxial with a second element, the package comprising:

base means having a first resilient inner section, and a first protective outer section, said first resilient inner section having a first raised portion for engaging the first element of the optical device;

cover means having a second resilient inner section, and a second protective outer section, said second resilient inner section having a second raised portion for engaging the first element; and clamping means for securing the base means to the cover means, whereby the first element is held between the first and second raised portions.

Another aspect of the present invention relates to a package for a device of the type comprising wires or fibers extending therefrom, the package comprising:

base means having a first resilient section at one end thereof including a first strain relief means;

cover means having a second resilient inner section at one end thereof including a second strain relief means; and clamping means for securing the base means to the cover means, whereby the first and second strain relief means form an annular strain relief member with a bore that gradually increases in diameter from an inner end proximate the device to an outer end remote from the device;

wherein the first strain relief means includes first mating surfaces, each extending from an inner edge at the bore to an outer edge at an outer surface thereof; wherein the second strain relief means includes second mating surfaces, complementary with the first mating surfaces, extending from an inner edge at the bore to an outer edge at an outer surface thereof; and wherein the inner edges of the first and second mating surfaces define a line, at least a portion of which is arcuate.

BRIEF DESCRIPTION OF THE DRAWINGS

The invention will be described in greater detail with reference to the accompanying drawings which represent preferred embodiments thereof, wherein:

FIG. 13 is a side view of a base of the optical device package of FIGS. 11 and 12;

FIG. 14 is a plan view of the base of FIG. 13;

FIG. 15 is an end view of the base of FIGS. 13 and 14;

FIG. 16 is a side view of a cover of the optical device package of FIGS. 11 and 12;

FIG. 17 is a plan view of the cover of FIG. 16;

FIG. 18 is an end view of the cover of FIGS. 16 and 17;

FIG. 19 is a plan view of a reinforcing sleeve of the optical device package of FIGS. 11 and 12;

FIG. 20 is a side view of the reinforcing sleeve of FIG. 19; and

FIG. 21 is an end view of the reinforcing sleeve of FIGS. 19 and 20.

DETAILED DESCRIPTION

Figure 1:
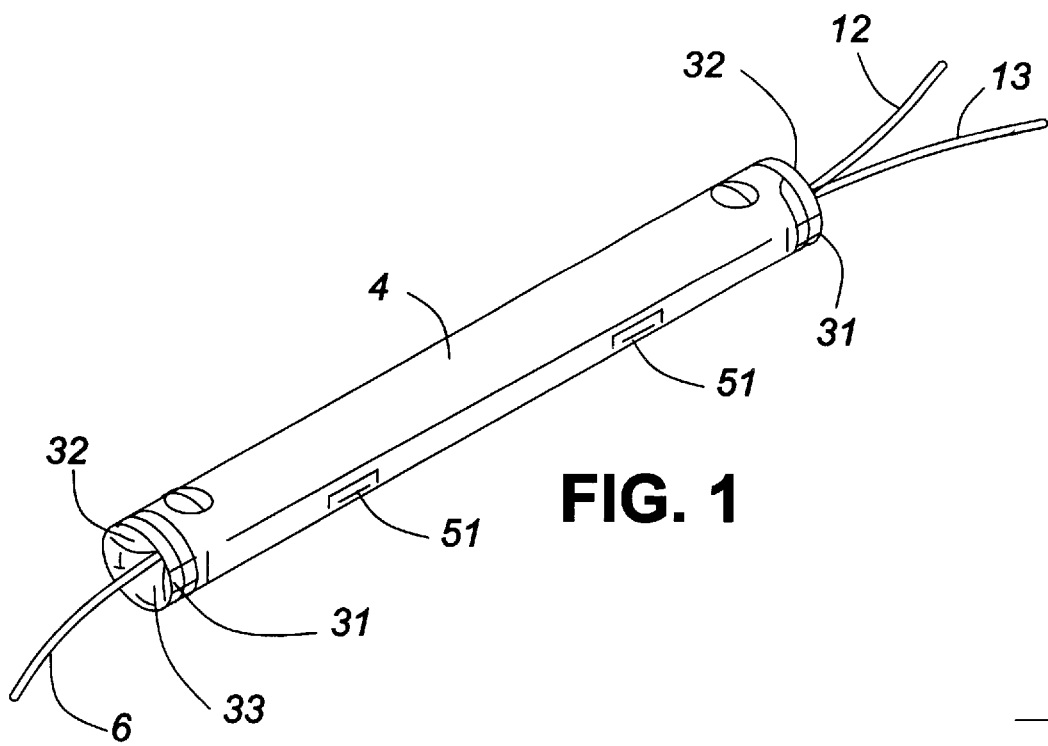
FIG. 1 is a perspective view of a first embodiment of the optical device package according to the present invention.
Figure 2:
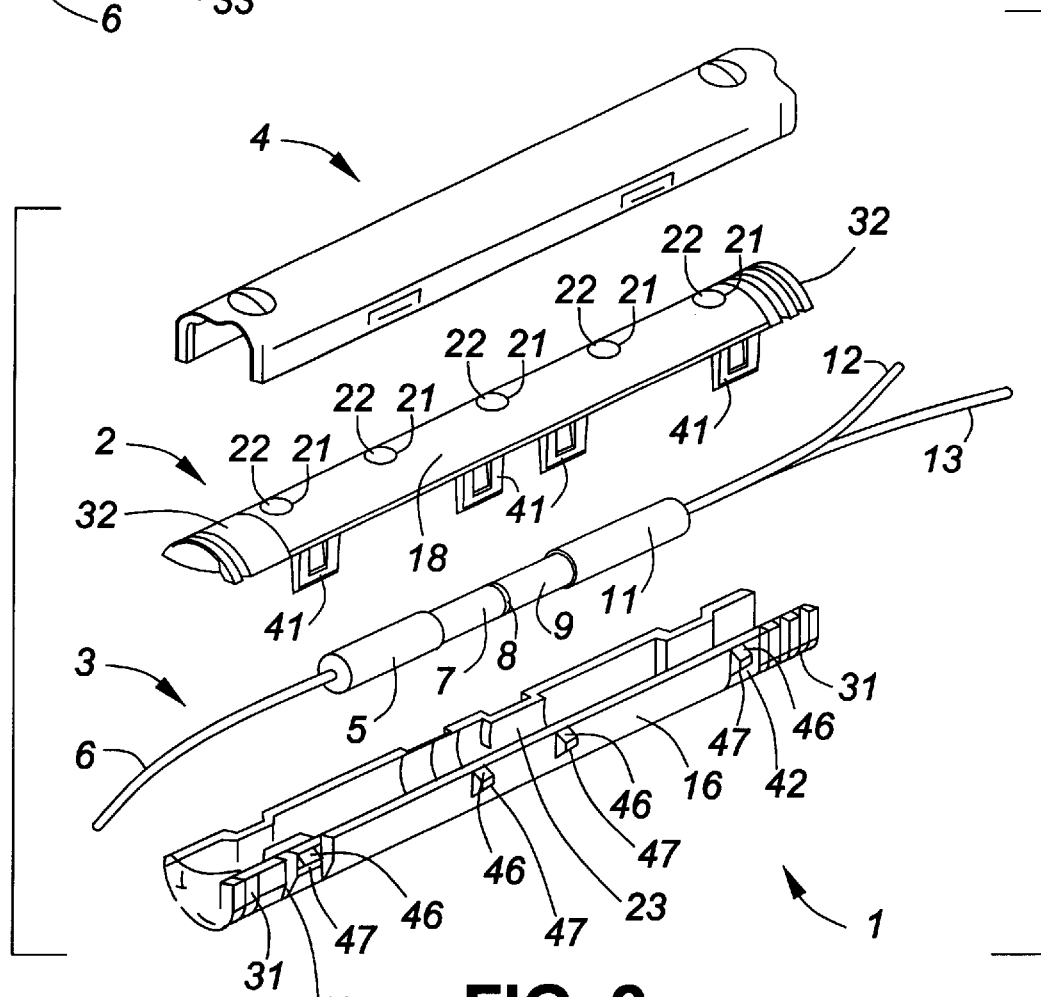
FIG. 2 is an exploded view of the optical device package of FIG. 1.

The first embodiment of the optical device package according to the present invention, which is illustrated in FIG. 1 to 10, includes a base member 1 and a cover member 2 for encasing an optical device 3. The optical device package may also include a reinforcing sleeve 4 for extra protection. The optical device package can be adapted to enclose any optical device, but is particularly useful with optical devices that include several elements with different diameters that have been fixed together non-concentrically. The optical device illustrated in FIG. 1 is a wavelength division multiplexing (WDM) coupler, which includes a single bore ferrule 5 encasing one end of an optical fiber 6, a first graded index (GRIN) lens 7, a WDM filter 8, a second GRIN lens 9, and a double bore ferrule 11 encasing one end of each fiber 12 and 13. What is evident from the drawing is that the GRIN lenses 7 and 9 have smaller diameters than the ferrule tubes 5 and 11; however, what is less evident is that many of the elements do not share the same longitudinal axis. During the optical alignment process it is necessary to slightly misalign some of the elements to maximize optical coupling between the fibers 6, 12 and 13.

Figure 3:
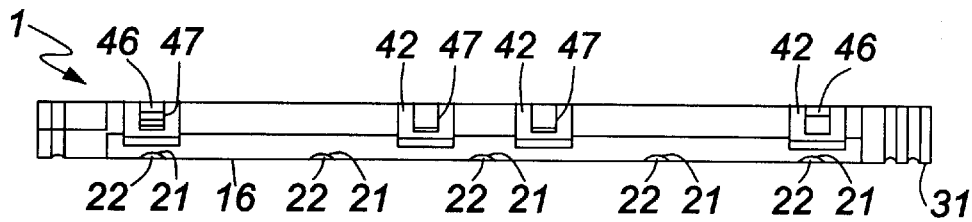
FIG. 3 is a side view of a base of the optical device package of FIGS. 1 and 2.
Figure 4:
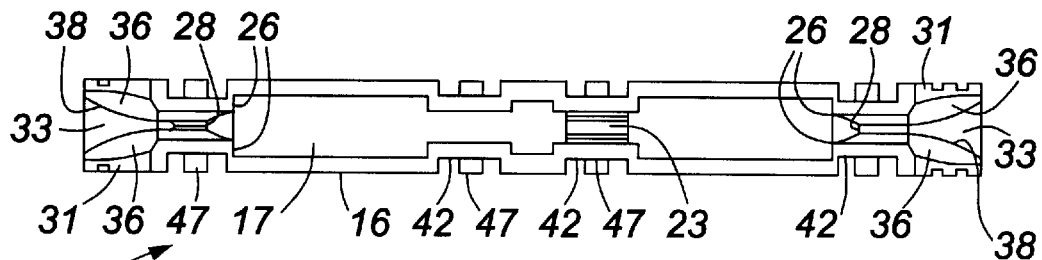
FIG. 4 is a plan view of the base of FIG. 3.
Figure 5:
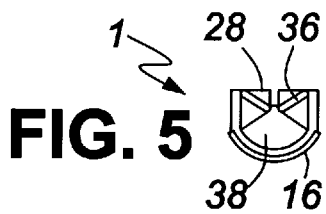
FIG. 5 is an end view of the base of FIGS. 3 and 4.
Figure 8:
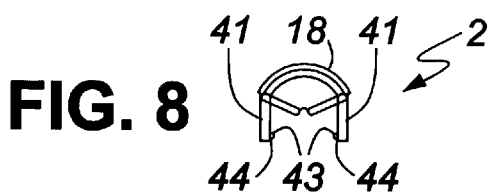
FIG. 8 is an end view of the cover of FIGS. 6 and 7.
Figure 6:
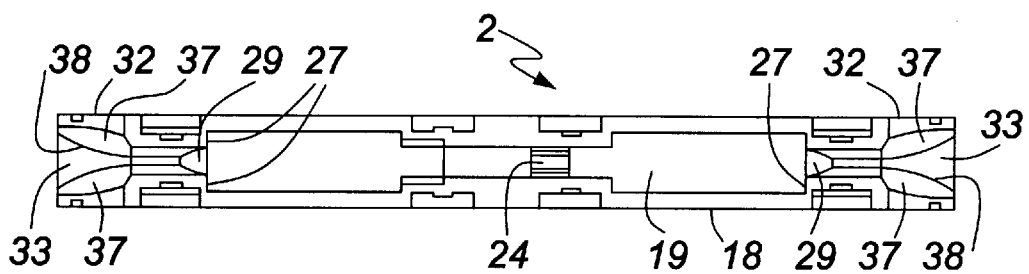
FIG. 6 is a plan view of a cover of the optical device package of FIGS. 1 and 2.
Figure 7:
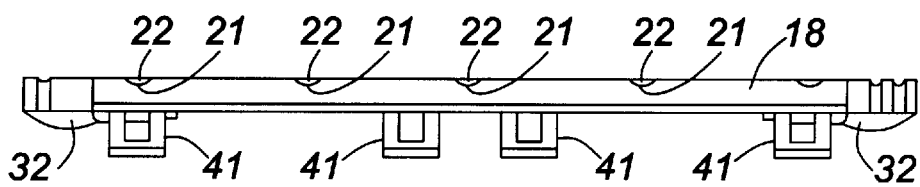
FIG. 7 is a side view of the cover of FIG. 6.
Figure 9:
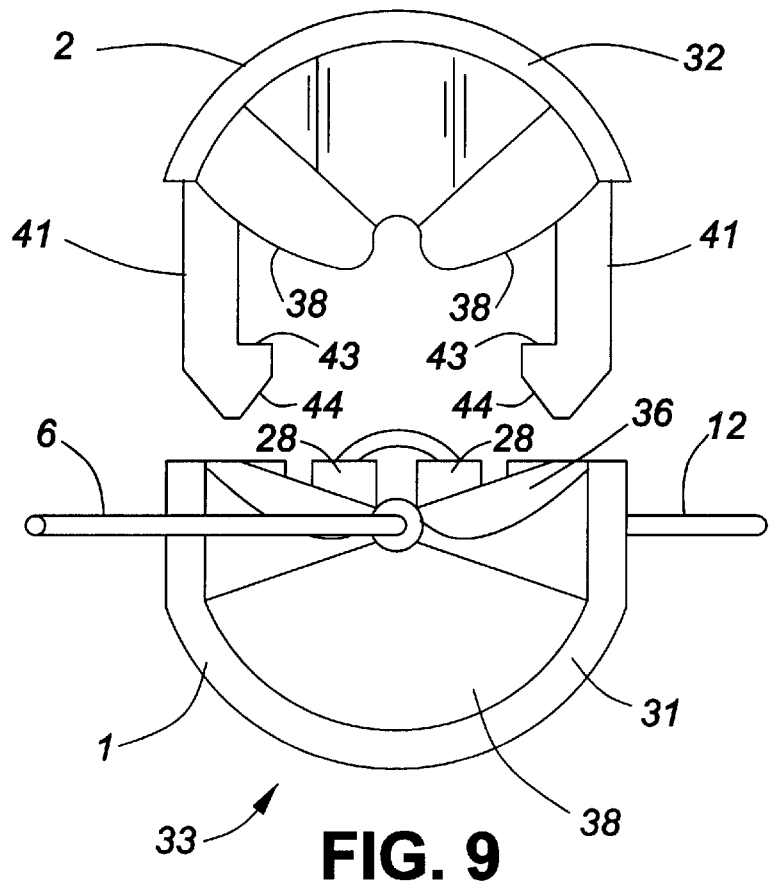
FIG. 9 is an exploded end view from one end of the optical device package of FIGS. 1 and 2.
Figure 10:
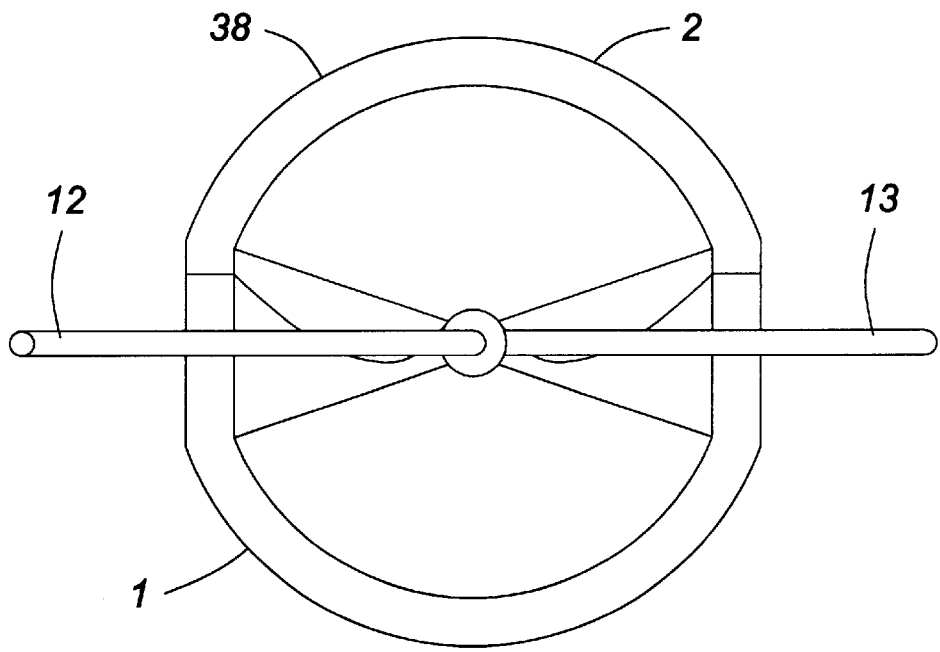
FIG. 10 is an end view from the other end of the optical device package of FIGS. 1 and 2.
Figure 11:
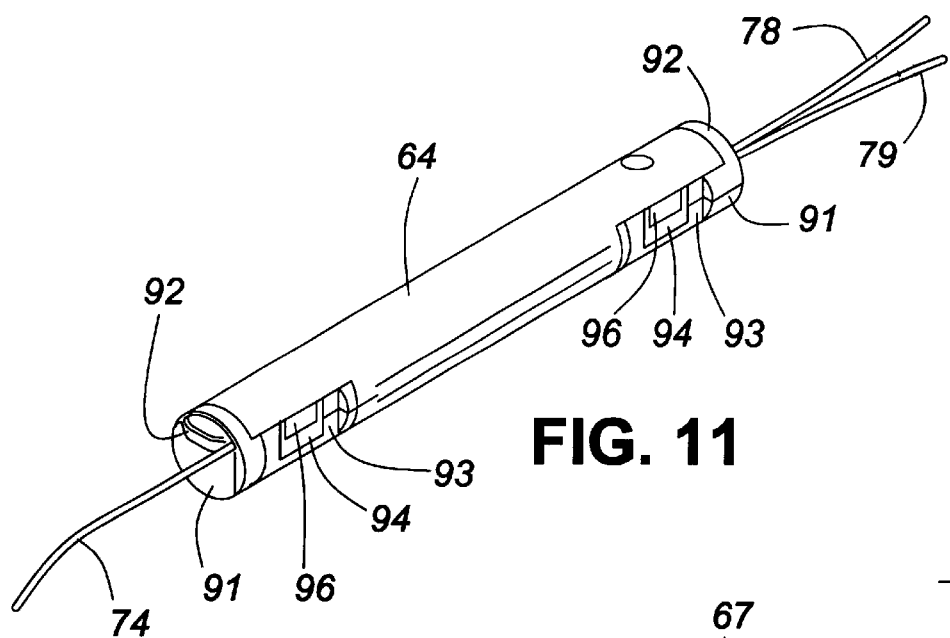
FIG. 11 is a perspective view of a second embodiment of the optical device package according to the present invention.
Figure 12:
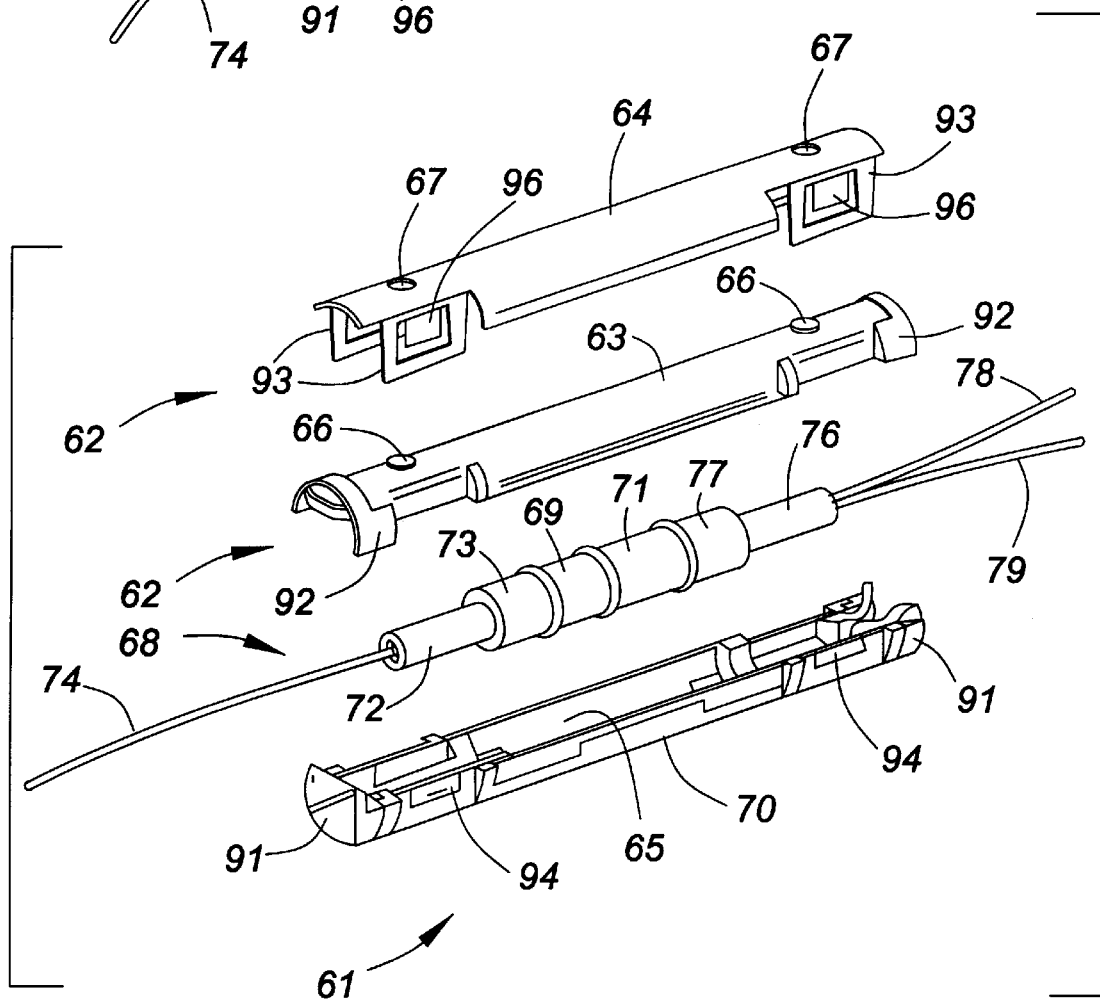
FIG. 12 is an exploded view of the optical device package of FIG. 11.

With reference to FIGS. 3, 4 and 5, the base member 1 includes a hard protective outer shell 16 and a resilient inner body 17. With reference to FIGS. 6, 7 and 8, the cover member 2 includes a hard protective outer shell 18 and a resilient inner body 19. The outer shells 16 and 18 protect the optical device 3 from stresses originating externally, while the inner bodies 17 and 19 provide a cushion for the optical device 3 in the event the outer shells 16 and 18 are not sufficiently strong to mitigate all of the external stress. The outer shells 16 and 18 and the resilient inner bodies 17 and 19 can be manufactured separately out of different types of plastic, or any other suitable material, and assembled manually. However, for the preferred embodiment, the base member 1 and the cover member 2 are manufactured using a multi-shot or insert injection molding technique, which results in the hard plastic shells 16 and 18 substantially covering the resilient bodies 17 and 19, respectively. Holes 21 (see FIGS. 2, 3 and 7), which extend through the outer shells 16 and 18, receive projections 22 extending contiguously from the inner bodies 17 and 19. The holes 21 and the projections 22 eliminate the need for a separate adhesive between the outer shells 16 and 18 and the inner bodies 17 and 19, respectively, although one can be applied for extra strength.

The majority of the inner bodies 17 and 19 are custom sized to loosely receive the optical device 3, i.e. big enough to allow free movement of the majority of the optical device 3, but small enough to provide the optical device 3 with a sufficient cushion in the event the device undergoes stress. However, one or more sets of raised portions, such as U-shaped raised portions 23 and 24, are provided to frictionally engage at least one of the elements of the optical device 3. In the illustrated embodiment the raised portions 23 and 24 are adapted to clamp the second lens 9 therein. The entire optical device 3 can not be similarly engaged because all of the elements of the optical device are not aligned nor are any two optical devices assembled identically. When two or more different elements of the optical device are consistently positioned relative to each other, two or more sets of raised portions can be provided, which engage the different elements, See FIGS. 11–21. Preferably, the base member 1 defines over half of the entire package, and ideally approximately two thirds thereof. Accordingly, the raised portion 23 in the base member 1 is able to securely clamp the corresponding optical element to stabilize the optical device 3 during assembly.

If the optical device 3 becomes disengaged from the raised portions 23 and 24 due to a pulling force on one of the fibers, shoulders 26 and 27 are provided at each end of the inner bodies 17 and 19, respectively, to abut the ends of the optical device 3. The shoulders 26 and 27 provide a resilient annular stop for the optical device 3, thereby preventing the optical device 3 from leaving the package, while absorbing a certain amount of the pulling force.

Each end of the inner bodies 17 and 19 also includes a gradually narrowing neck portion formed by mating neck portions 28 and 29 on the inner bodies 17 and 19, respectively. The mating neck portions 28 and 29 are adapted to receive the optical fibers 6, 12 and 13, and align them proximate the longitudinal axis of the device. In the preferred embodiment, in which the base member 1 forms a greater percentage of the overall circumference of the package than the cover member 2, the neck portion 28 forms a channel for receiving the optical fibers, while the neck portion 29 includes an elongated projection for closing the open end of the channel. Accordingly, the neck portion 28 protects the fibers during assembly by preventing them from being trapped out of position between the base 2 and cover 1. The neck portions 28 and 29 are sized to receive the required number of fibers, e.g. 1 or 2, in any possible alignment, e.g. adjacent or superposed.

Integrated strain relief elements 31 and 32 are provided at each end of the inner bodies 17 and 19, respectively, to protect the portion of the fibers exiting the package from damage caused by bending. The strain relief elements 31 and 32 form an annular strain relief member with a central bore 33, which gradually increases in size from its inner end proximate the optical device 3 to the outer free end thereof. The term central bore is not meant to be limited to a bore in the geometric center of the strain relief member, but rather anywhere inside the periphery thereof. In fact, improved strain relief may be obtained from a bore not positioned in the geometric center of the strain relief member The mating surfaces 36 and 37 of the strain relief elements 31 and 32, respectively, are specially designed to include a difficult path for the optical fibers, which prevents the optical fibers from slipping between the strain relief elements 31 and 32 into contact with the outer shells 17 and 19. There are two aspects that combine to create the difficult path: the first aspect is the shape of the mating surfaces 36 and 37 at the inner wall 38, and the second aspect is the direction in which the mating surfaces 36 and 37 extend from the inner wall 38. At the inner wall 38, the mating surfaces 36 and 37 define an arcuate or a circuitous path, thereby making it extremely difficult for a fiber extending outwardly from one end of the package to work its way therebetween. Moreover, the mating surfaces 36 and 37 do not extend radially through the wall of the strain relief member, rather at an angle therethrough, making it even more difficult for a fiber to work its way out, because any bending force on the fiber will be transferred radially to the inner wall 38.

A plurality of C-shaped hook arms 41, extending from the outer shell 18, are provided as part of a plurality of snap clips for fastening the cover member 2 to the base member 1. The arms 41 are received in corresponding recesses 42 in the outer shell 16. Each arm 41 includes a detent 43 with a cam surface 44 (See FIGS. 8 and 9). Each snap clip also includes a corresponding cam surface 46 on a detent 47 (See FIGS. 2, 3 and 4), which extends into each recess 42. During assembly, the corresponding cam surfaces 44 and 46 enable the detents 43 to pass over the detents 47, and lock into place therebehind. The snap clips lock the cover member 2 to the base member 1, while squeezing the inner resilient bodies together along their mating longitudinal seams forming a seal.

The reinforcing sleeve 4 is provided when extra protection is required. Detents 51 are punched from the walls of the reinforcing sleeve 4 for frictionally engaging one of the outer shells 16 or 18.

With reference to FIGS. 11 to 21, a second embodiment of the present invention includes a base member 61 and a cover member 62. The cover member 62 comprises a resilient inner body 63, and a hard outer shell 64, which are assembled separately. Preferably, the inner body 63 is a resilent plastic, while the outer shell 64 is metal. Projections 66, extending from the inner body 63, are received in holes 67, extending through the outer shell 64, for preventing relative movement between the inner body 63 and the outer shell 64. The base member 61 comprises a resilient inner body 65 and a hard outer shell 70. Preferably, the base member 61 is manufactured using the multi-shot or insert molding techniques mentioned above.

In this embodiment the package protects an optical member 68, which includes a first lens (not shown) mounted in a first sleeve 69, and a second lens (not shown) mounted along with a WDM filter (not shown) in a second sleeve 71. A single fiber tube 72 is mounted in a third sleeve 73, which is attached to one end of the first sleeve 69. The single fiber tube encases one end of an optical fiber 74. A double bore tube 76 is mounted in a fourth sleeve 77, which is attached to one end of the second sleeve 71. The double bore tube 76 encases one end of optical fibers 78 and 79.

In optical element 68, the relative positions of the third and fourth sleeves 73 and 77 are substantially fixed, whereby two sets of raised portions 81 and 82 (See FIG. 14) are provided on the inner body 65 to hold the third and fourth sleeves 73 and 77, respectively, while the remaining elements remain floating. Each set of raised portions 81 and 82 comprises two longitudinally extending raised portions. With reference to FIG. 17, the inner body 63 of the cover member 62 includes laterally extending raised portions 83 and 84, which co-operate with the sets of raised portions 81 and 82, respectively, to hold the optical element 68 therebetween.

As in the aforementioned embodiment, shoulders 86 formed in the inner body 65 co-operates with shoulders 87 formed in the inner body 63 to prevent the optical device 68 from being pulled from the package. Similarly, neck portions 88 in the inner body 65 co-operates with neck portions 89 in the inner body 63 to guide and protect the fibers 74, 78 and 79 during assembly.

Integrated strain relief portions 91 of the inner body 65 engage integrated strain relief portions 92 of the inner body 63. The strain relief portions 91 and 92 are identical to the above identified strain relief portions 31 and 32, respectively.

Snap clips for holding the package together are comprised of U-shaped hook arms 93 extend downwardly from the outer shell 64 for engaging detents 94, which extend outwardly from the outer shell 70. The detents 94 are provided with a cam surface, which enables the arms 93 to pass over the detents 94 and lock therebehind. Locking fingers 96 extend downwardly from the outer shell 64 into the space defined by the arms 93 for engaging the top of the detents 94, thereby preventing any relative movement between the outer shells 64 and 70.

We claim:

1. A package for an optical device of the type comprising a plurality of elements including a first element that is not coaxial with a second element, the package comprising:

base means having a first resilient inner section, and a first protective outer section, said first resilient inner section having a first raised portion for engaging the first element of the optical device;

cover means having a second resilient inner section, and a second protective outer section, said second resilient inner section having a second raised portion for engaging the first element; and clamping means for securing the base means to the cover means, whereby the first element is held between the first and second raised portions.

2. The package according to claim 1, further comprising strain relief means mounted on one end of the package, said strain relief means having a bore for receiving at least one optical fiber extending from the optical device.

3. The package according to claim 2, wherein the bore has a diameter that gradually increases from an inner end proximate the optical device to an outer end remote from the optical device.

4. The package according to claim 3, wherein the strain relief means comprises a first part integral with the first resilient inner section, and a second part integral with the second resilient inner section.

5. The package according to claim 4, wherein the first part of the strain relief means extends beyond the first protective outer section, and the second part of the strain relief means extends beyond the second protective outer section.

6. The package according to claim 4, wherein the first part of the strain relief means includes a first mating surface extending from an inner edge at the bore to an outer edge at an outer surface thereof; wherein the second part of the strain relief means includes a second mating surface complementary with the first mating surface extending from an inner edge at the bore to an outer edge at the outer surface thereof; and wherein the inner edges of the first and second mating surfaces define a line, at least a portion of which is arcuate.

7. The package according to claim 6, wherein the line defining the inner edges of the first and second mating surfaces is an arcuate line extending from the inner end of the bore to the outer end of the bore.

8. The package according to claim 6, wherein the first and second mating surfaces extend at an angle relative to a line extending radially from a center of the bore.

9. The package according to claim 1, wherein at least one of the first and second resilient sections includes a shoulder portion for abutting the optical device when the optical device is disengaged from the first and second raised portions to prevent the optical device from being pulled from the package.

10. The package according to claim 1, the first and second resilient sections include co-operating neck portions for aligning at least one optical fiber, which extends from the optical device, proximate a central axis of the package.

11. The package according to claim 10, wherein the neck portion of the first resilient section defines more than one half of the total circumference of the combined neck portions, thereby providing a channel for receiving and protecting the at least one optical fiber during assembly.

12. The package according to claim 1, further comprising a third raised portion on the first resilient section for engaging a third element of the optical device, and a fourth raised portion on the second resilient section for engaging the third element of the optical device.

13. The package according to claim 1, wherein the first raised portion is U-shaped.

14. The package according to claim 13, wherein the base means defines over half of the total circumference of the package, and wherein the U-shaped raised portion is adapted to hold the first element therein during assembly of the package.

15. The package according to claim 1, wherein said clamping means comprises snap clips, said snap clips comprising hook means extending from one of the first or the second outer shells, and detent means extending from the other of the first or the second outer shells.

16. The package according to claim 1, wherein the first resilient inner body and the first protective outer shell form a single integral base.

17. The package according to claim 16, wherein the single integral base is manufactured from two different kinds of plastic using a multi-shot or insert molding technique.

18. A package for a device of the type comprising wires or fibers extending therefrom, the package comprising:

base means having a first resilient section at one end thereof including a first strain relief means;

cover means having a second resilient inner section at one end thereof including a second strain relief means; and clamping means for securing the base means to the cover means, whereby the first and second strain relief means form an annular strain relief member with a bore that gradually increases in diameter from an inner end proximate the device to an outer end remote from the device;

wherein the first strain relief means includes first mating surfaces, each extending from an inner edge at the bore to an outer edge at an outer surface thereof; wherein the second strain relief means includes second mating surfaces, complementary with the first mating surfaces, extending from an inner edge at the bore to an outer edge at an outer surface thereof; and wherein the inner edges of the first and second mating surfaces define a line, at least a portion of which is arcuate.

19. The package according to claim 18, wherein the line defining the inner edges of the first and second mating surfaces is an arcuate line extending from the inner end of the bore to the outer end of the bore.

20. The package according to claim 18, wherein the first and second mating surfaces extend at an angle relative to a line extending radially from a center of the bore.

* * * * *